United States Patent [19]

Folkert

[11] 3,753,580

[45] Aug. 21, 1973

[54] STEERING SYSTEM FOR TRAILERS
[76] Inventor: Henry Folkert, Rt. 1, Box 107, Granger, Wash. 98932
[22] Filed: Jan. 3, 1972
[21] Appl. No.: 214,580

[52] U.S. Cl................................. 280/443, 280/103
[51] Int. Cl............................................. B62d 53/00
[58] Field of Search.................... 280/443, 444, 445, 280/103, 80, 96.1, 426, 446 R

[56] References Cited
UNITED STATES PATENTS

| 1,600,635 | 9/1926 | Isachsen | 280/443 |
| 2,100,447 | 11/1937 | Mahaffey | 280/443 |
| 2,411,836 | 11/1946 | Seckel | 280/80 R |
| 2,559,487 | 7/1951 | Whitlow | 280/444 |
| 2,918,300 | 12/1959 | Hendrickson | 280/80 R |
| 2,582,455 | 1/1952 | Potter | 280/103 |

FOREIGN PATENTS OR APPLICATIONS

| 521,349 | 3/1955 | Italy | 280/443 |
| 1,528,768 | 5/1968 | France | 280/443 |

Primary Examiner—Leo Friaglia
Attorney—Marvin E. Jacobs

[57] ABSTRACT

A steering system for trailers and other non-powered wheeled vehicles that are pulled or towed. A novel linkage arrangement is provided to turn the wheels of the trailer in response to a turning of the pulling vehicle whereby the wheels of the trailer will track in the same path as the wheels of the pulling vehicle. Further provision is made so that the wheels of the trailer can turn and still clear apparatus or structures on the tractor frame that fit closely between the upper portion of the wheels of the trailer when said wheels are in a straight position.

8 Claims, 4 Drawing Figures

STEERING SYSTEM FOR TRAILERS

BACKGROUND OF THE INVENTION

The present invention relates generally to steering apparatus for trailers and other towed or pulled vehicles, and more particularly, to an improved steering apparatus which enables the towed or pulled vehicle to accurately follow the path of the wheels of the pulling vehicle.

In conventional two-wheeled trailers attached to a tractor or automobile by means of the well-known single point ball hitch, it is extremely difficult if not impossible to cause the trailer to follow the identical path of the tractor or automobile, especially on curves and turns. While this is not a serious problem when pulling a trailer or similar type vehicle in conventional street traffic, the problem of having the trailer wheels track in the same path as the wheels of the pulling vehicle becomes extremely important on narrow, tortuous roads and farming applications. For example, when pulling a trailer with a tractor down the narrow rows between planted crops, the failure of the trailer to track in the same path as the tractor on a turn between rows of crops, could result in the trailer running over valuable crops and destroying same.

Still another problem encountered with trailers and other pulled vehicles that tend to turn at a sharper radius than the pulling vehicle, is that in farming and other applications, many times it is desirable to run a power take-off shaft from the pulling vehicle such as a tractor to the trailer to operate a pump, compressor, generator or the like, mounted on the trailer which depends on the power-take-off shaft for its operation. In the situation where the trailer turns at a greater radius than the pulling vehicle, the angle that the power take-off shaft must be operated, at places an extreme strain on the universal joints and the shaft and further requires extremely expensive joints to operate at such extreme angles.

Still another problem encountered in presently existing trailers both with and without steerable wheels, is that in many instances, the wheels on each side of the trailer must be spaced an excessive distance apart in order to clear the particular apparatus carried by the trailer. While in some instances it is possible to provide an apparatus such as a tank or a dump bed to be carried on a trailer with recessed openings for the wheels, this is often extremely difficult and expensive to accomplish. In situations where a trailer must be narrow, such as in farming, so that it will fit between successive rows of crops, the spacing between the wheels on the opposite sides of the trailer become extremely important.

SUMMARY OF THE INVENTION

Accordingly, it is the general aim of the present invention to provide a new and improved steering system for use with trailers and other similar non-powered wheeled vehicles that are intended to be pulled which enable the trailer to follow the same path as the pulling vehicle in a manner that is far superior from the standpoint of cost, reliability and maintenance than has heretofore been known in the prior art.

It is another object of the present invention to provide a steering system of the instant type which enables the wheels on the opposite sides of a trailer provided with the instant system to be spaced closer together while still clearing an object or apparatus carried by the trailer than have trailers having steerable wheels heretofore known in the prior art.

BRIEF DESCRIPTION OF THE DRAWINGS

The above stated and other objects and advantages of the instant invention will readily appear from the following description taken in conjunction with the accompanying drawings in which.

Figure 1:
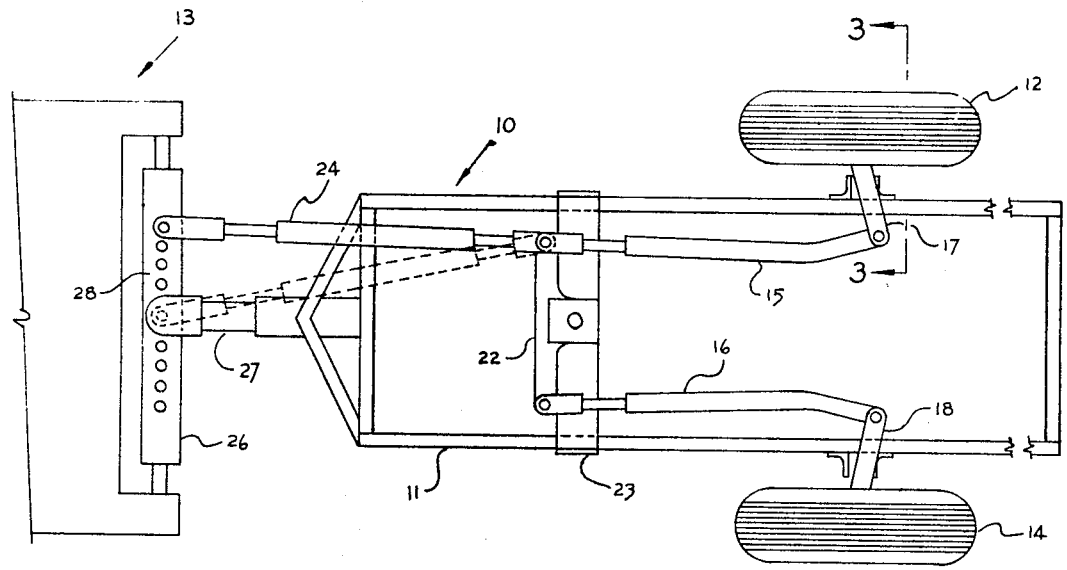
FIG. 1 is a bottom view, of an exemplary trailer embodying the features of the present invention depicted in use when the trailer is being pulled in a generally straight direction.

While the present invention is susceptible of various modifications and alternative constructions, the illustrative embodiment shown in the drawings will herein be described in detail. It should be understood, however, that it is not intended to limit the invention to the particular forms disclosed, but, on the contrary, the intention is to cover all modifications, equivalents and alternative constructions falling within the spirit and scope of the invention is expressed in the appended claims.

DESCRIPTION OF THE PREFERRED EMBODIMENT

Figure 2:
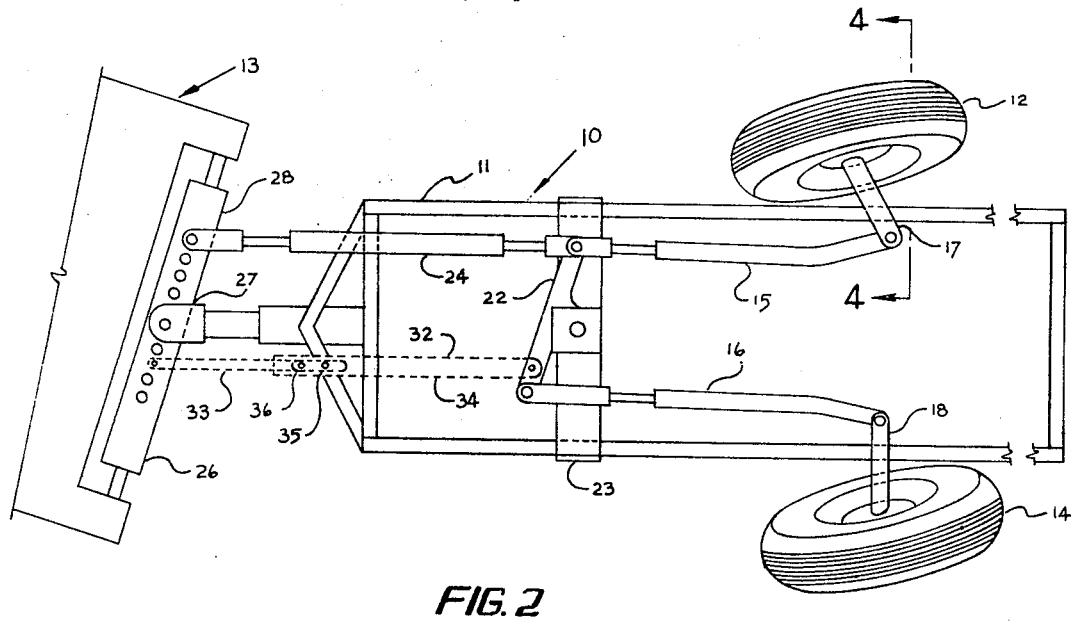
FIG. 2 is a bottom view of the exemplary trailer depicted in FIG. 1, but here showing the steering system of the trailer responding to a right turn by the vehicle pulling the trailer.

Referring now to FIGS. 1 and 2, a trailer, provided with an exemplary steering system, generally indicated at 10, is illustrated. The trailer, includes a frame 11 and a pair of wheels 12 and 14, each independently pivotally mounted on respectively opposite sides of said trailer, in a manner to be hereinafter set forth in detail.

In accordance with one of the important aspects of the present invention, wheels 12 and 14 are provided to follow the same track or path that is traversed by the vehicle that is pulling the trailer 10. This vehicle is generally indicated at 13 in FIGS. 1 and 2. As illustrated in FIGS. 1 and 2, common tracking of the vehicle 13 and the trailer 10 is accomplished by a mechanical linkage arrangement which makes the wheels 12 and 14 of the trailer 10 turn in response to a turning of the vehicle 15. This linkage arrangement includes a pair of drag links 15 and 16, each having one end thereof pivotally attached to their respective steering control arms 17 and 18 which cause the turning of their respective wheels 12 and 14. The opposite ends of drag links 15 and 16 are pivotally affixed to opposite ends of a center pinned single tree 22 which is pivotally pinned at its center to a cross frame member 23 of the trailer 10.

In order to pivot the single tree 22 about its center point, thereby moving drag links 15 and 16 the same distance but in opposite directions resulting in the turning of wheels 12 and 14 in the same direction as shown in FIG. 2, a rigid arm 24 is pivotally mounted between one end of the single tree 22 and the draw or attachment bar 26 of the pulling vehicle 13.

It will be readily apparent by referring concurrently to FIGS. 1 and 2, that since the hitch 27 of the trailer is pivotally affixed to the center of the draw bar 26, that when the pulling vehicle 13 turns in a right or left direction, the rigid arm 24 by virtue of being pivotally mounted off center of the draw or attachment bar 26, is shifted generally longitudinally with respect to the trailer 10, thereby pivoting the single tree 22 about its center point on frame member 23 which as aforesaid, moves drag links 15 and 16 an equidistant amount but in opposite directions thereby turning wheels 12 and 14 in direct response to the turning of the pulling vehicle 13.

In order to adjust the exemplary steering system to track identically with the wheels of the pulling vehicle 13, rigid arm 24 can be selectively mounted in any of the holes 28 provided in the draw or attachment bar 26 for this purpose, and to facilitate said adjustment, it is contemplated that the rigid arm 24 will be provided as being selectively adjustable as to length by means, for example, of a two-piece telescoping arrangement with set screws. It is further pointed out that should it not be desired for a particular application, to turn wheels 12 and 14, the rigid arm 24 can be connected at the center of the draw or attachment bar 26 as depicted in dotted lines in FIG. 1, thereby maintaining the entire exemplary steering system and the wheels in a locked straight position.

It is further pointed out that by running the drag links 15 and 16 from the steering control arms 17 and 18 to the single tree in a direction generally longitudinal with the trailer 10, the conventional track arm and track rod utilized in king pin steering systems is eliminated thereby leaving the space between the two wheels of the trailer free of any steering linkage members which could interfere with particular apparatus on structures desired to be mounted on the trailer frame.

Figure 3:
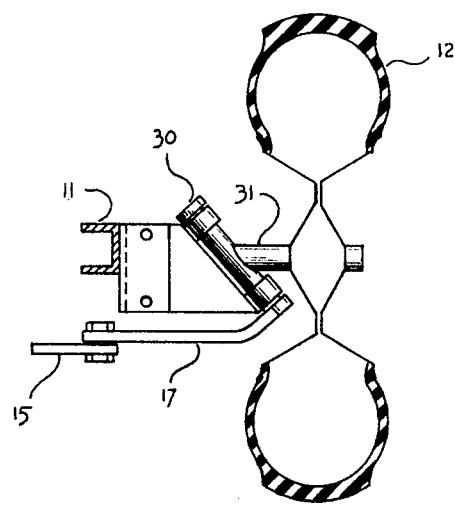
FIG. 3 is a back fragmentary sectional view taken substantially along the line 3—3 of FIG. 1.

In accordance with another important aspect of the present invention, provision is made for simultaneously turning the wheels 12 and 14 while still providing clearance with an apparatus or structure mounted on the trailer frame 11 which fits closely between wheels 12 and 14 when they are in a straight position as depicted in FIGS. 1 and 3. To accomplish this, the king pin 30 is mounted so as to turn at an angle with the plane of the trailer frame as shown in FIG. 3 with the axle stub 31 adapted to project in the same plane as the trailer frame when the wheels of the trailer are in a straight position. By locating the king pin 30 at an angle with the plane of the trailer frame 11, the wheels of the trailer will tend to tilt when they turn with the upper portion thereof being directed outwardly from the trailer and the lower portion thereof being directed inwardly thereby having the upper portion of the wheel maintain clearance with an apparatus or structure on the trailer that is close to the upper portion when the wheel is in a straight position.

In practice, it has been found that locating the king pin 30 at an angle of about 45° with the plane of the trailer frame 11, produces satisfactory results however, for particular applications, this angle could be increased or decreased without departing from the scope and spirit of the present invention.

Figure 4:
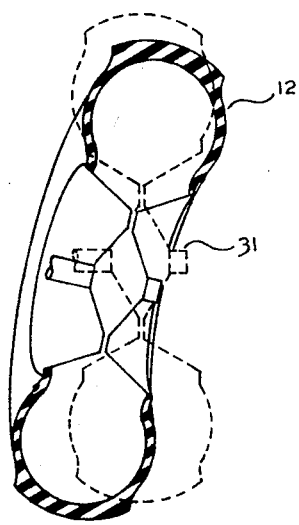
FIG. 4 is a fragmentary sectional view taken substantially along the line 4—4 of FIG. 2.

For example, it has been found that when the king pin 30 is disposed at an angle of about 42° with the plane of the trailer frame 11 as shown in FIG. 3 and in whole lines in FIG. 4, not only do the upper portions of wheels 12 and 14 tilt away from the trailer thus clearing apparatus or structures mounted on the trailer frame 11 as aforesaid and as depicted in broken lines in FIG. 4, but in addition, at this angle the wheels 12 and 14 have an inherent tendency to seek their straight ahead position. Accordingly, this inherent tendency has the desirable result of minimizing the trailer wandering off to one side of the pulling vehicle or the other if there is excessive tolerance in the steering linkage of the trailer. This feature is of particular importance when the trailer is being pulled at highway speeds and it has been found that a trailer provided with this feature of the present invention, can be towed at highway speeds without the rigid arm 24 being utilized or in the aforesaid locked position and the wandering of the trailer both empty and under load will be far less than that of a conventional two wheel trailer having its wheels fixed in a straight position.

Turning next to another important aspect of the present invention, provision is also made whereby, if desired, a delay in the turning of the wheels of the trailer 10 in response to the turning of the pulling vehicle 13 can be imparted to the steering system of the trailer 10. This feature finds use, for example, when it is desirable not to have the trailer 10 start turning until it reaches the same location that the pulling vehicle 13 was at when it started its turn. It will be readily appreciated that such a situation would occur when the vehicle 13 and trailer 10 are being utilized in a confined area with adjacent obstacles such as rows of crops or the like.

To carry out the aforestated feature, the rigid arm 24 is replaced with arm 32 shown in broken lines in FIG. 2. This arm 32 instead of being rigid is constructed whereby one portion 33 extends into the other larger diameter portion 34 and is free to telescopically slide therein, thereby being capable of effectively changing the overall length of the arm 32 within the range dictated by an elongated slot 35 provided in the larger diameter portion 34 in which a guide pin 36 affixed to the smaller diameter portion 33 is located, which as shown in FIG. 2, provides a stop at each end of slot 35 by virtue of the abutment of the guide pin 36 therewith.

It will then be readily apparent to those skilled in the instant art, that if the guide pin 36 is disposed within the slot 35 whereby it is in a mid-position therein when the wheels 12 and 14 of the trailer are in a correspondingly straight position, upon the turning of the pulling vehicle in either direction, the guide pins 36 will first have to abut one of the ends of the slot 35 before the portion 34 of the arm 32 and the remainder of the steering system of the trailer 10 operatively responds to said turning. Accordingly, by providing a slot 35 of predetermined length, a desired amount of lost motion can be built into the steering system of the trailer 10 so as to delay the turning of the trialer 10 in response to the turning of the pulling vehicle 13 until the trailer reaches the location that the vehicle made its turn on some other desired location. It is further pointed out that the arm 32 can be selectively positioned in any desired location on the draw or attachment bar 26 in holes 28 provided therefor and/or at any desired location on the single tree 22 in a similar manner so as to provide a desired relationship or ratio between the turning radius of the pulling vehicle 13 and the turning radius of the trailer 10.

What is claimed is:

1. A trailer steering system comprising a pair of wheel receiving means each pivotally mounted to a trailer on opposite sides of the trailer from the other; an elongated steering control arm rigidly fixed to each of said wheel receiving means and extending generally inwardly from said wheel receiving means and their respective pivots; a single tree pivotally mounted intermediate its ends to the trailer at an intermediate point thereon and at a location remotely spaced from said wheel receiving means and generally disposed in a direction perpendicular to the direction of travel of the trailer; first and second drag links pivotally mounted to and interconnecting each of said steering control arms to the side of said single tree that each said respective steering control arm is situated; hitch means affixed to one end of the trailer for attachment to the rearward portion of a pulling vehicle at the generally central portion of the pulling vehicle; and an elongated linkage member having one end pivotally connected to said single tree at a location on said single tree remote from the location of said pivotal mounting of the tree to the trailer, and the other end of the member pivotally mounted to the rearward portion of the pulling vehicle at a location offset from the position where said hitch means is attached thereto, whereupon on the turning of the pulling vehicle, the said elongated linkage member pivotally displaces said single tree thereby moving said drag links a generally equal amount but in opposite directions thereby pivoting said wheel receiving means in a predetermined ratio to the turning of the pulling vehicle.

2. The apparatus set forth in claim 1 wherein each said wheel receiving means includes a king pin for pivotally mounting said wheel receiving means to the trailer.

3. The apparatus as set forth in claim 2 wherein each said king pin is inwardly and angularly disposed whereby when the trailer is traveling in a generally straight direction, a wheel received by each of said wheel receiving means will be disposed generally perpendicularly to the ground and when the trailer is in a turning position, the same wheel will be disposed such that its lower portion tilts inwardly and its upper portion tilts outwardly.

4. The apparatus as set forth in claim 3 wherein each said king pin is inwardly and angularly disposed at an angle substantially 42° with the ground.

5. The apparatus as set forth in claim 1 wherein said drag links are disposed in the same general direction as that of the direction of travel of the trailer.

6. The apparatus as set forth in claim 1 wherein said elongated linkage member is adapted to be selectively fixedly positioned at one of a plurality of predetermined lengths whereby the end thereof pivotally mounted to the rearward portion of the pulling vehicle can be so mounted at predetermined distances of offset from the position where said hitch means is attached thereto, thereby resulting in selective predetermined ratios of steering between the pulling vehicle and the trailer.

7. The apparatus as set forth in claim 6 wherein said elongated linkage member includes means to freely expand or contract within a predetermined amount of travel, thereby providing a delay in the response of the trailer steering to the turning of the pulling vehicle.

8. The apparatus as set forth in claim 1 wherein said elongated linkage member includes means freely expand or contract within a predetermined amount of travel, thereby providing a delay in the response of the trailer steering to the turning of the pulling vehicle.

* * * * *

UNITED STATES PATENT OFFICE
CERTIFICATE OF CORRECTION

Patent No. 3,753,580         Dated August 21, 1973

Inventor(s) Henry Folkert

It is certified that error appears in the above-identified patent and that said Letters Patent are hereby corrected as shown below:

Column 6, line 29, after "means" insert --to--.

Signed and sealed this 8th day of January 1974.

(SEAL)
Attest:

EDWARD M. FLETCHER, JR.　　　　　RENE D. TEGTMEYER
Attesting Officer　　　　　　　　Acting Commissioner of Patents